Jan. 22, 1924.
C. V. McINTIRE
1,481,427
TREATING OF COAL AND MANUFACTURE OF BRIQUETTES
Filed Aug. 9, 1920   3 Sheets-Sheet 1
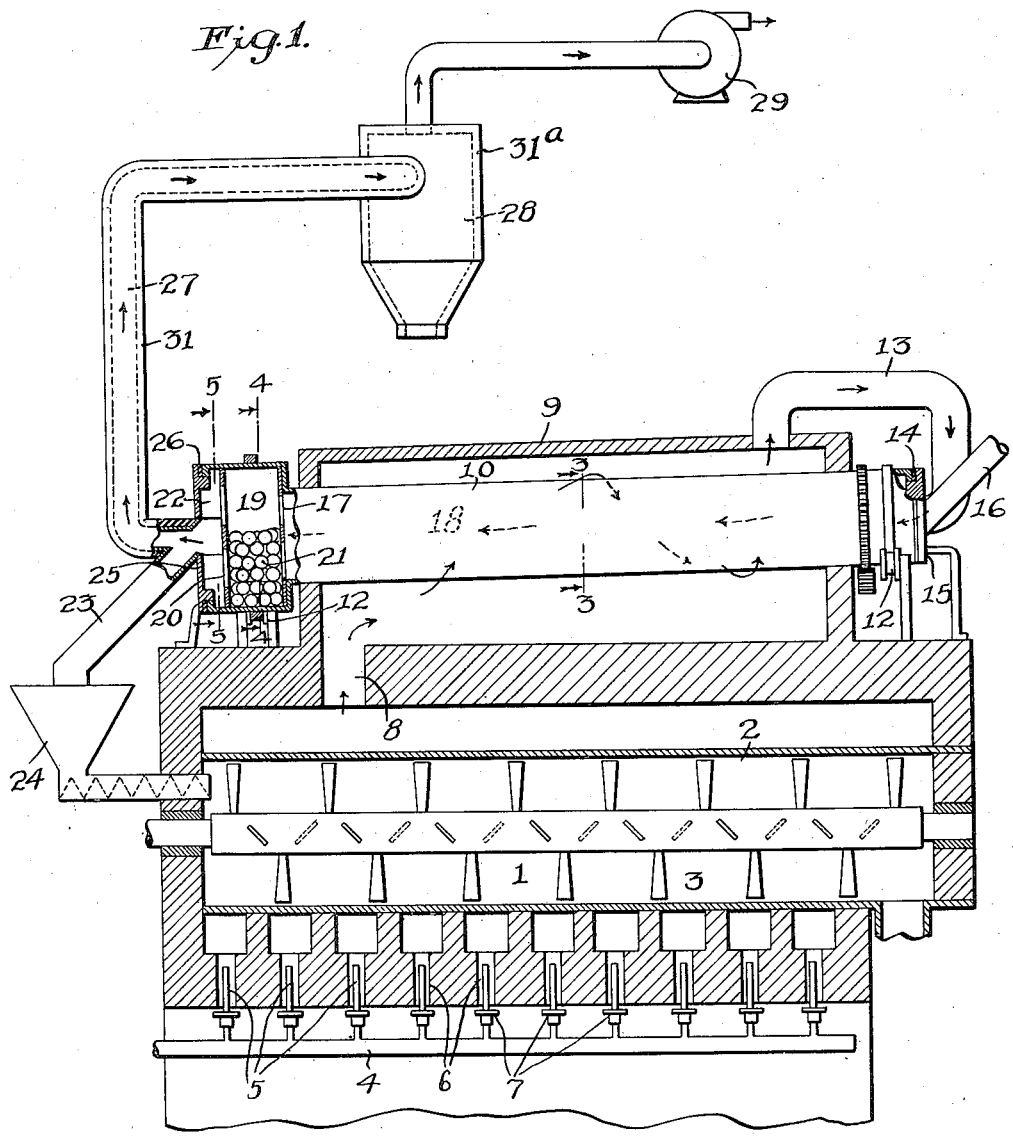
INVENTOR.
Charles V McIntire
BY
Edwin A Packard
ATTORNEY Jan. 22, 1924. 1,481,427
C. V. McINTIRE
TREATING OF COAL AND MANUFACTURE OF BRIQUETTES
Filed Aug. 9, 1920 3 Sheets-Sheet 2
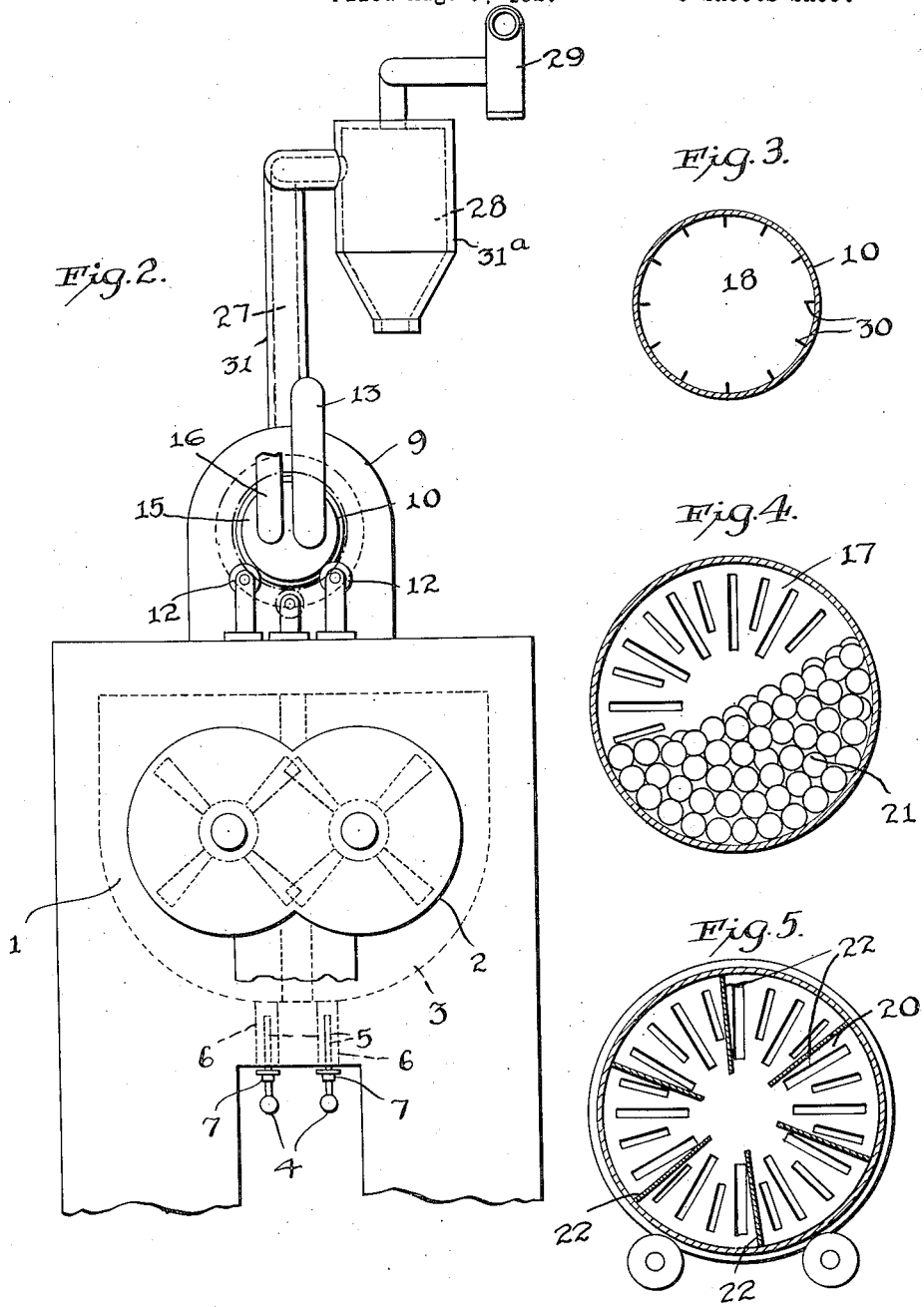

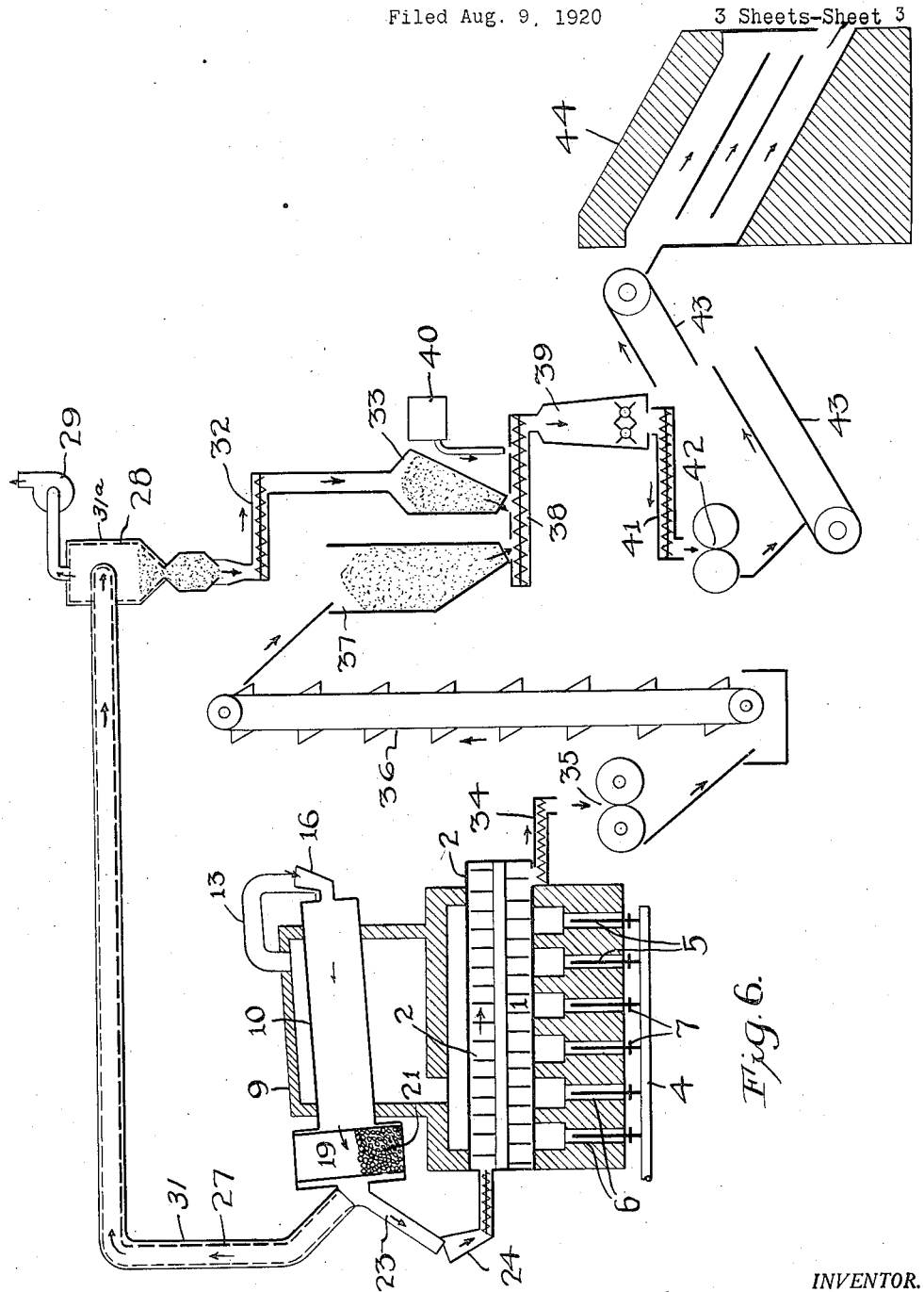

Patented Jan. 22, 1924.

1,481,427

UNITED STATES PATENT OFFICE.

CHARLES V. McINTIRE, OF EAST ORANGE, NEW JERSEY, ASSIGNOR TO INTERNATIONAL COAL PRODUCTS CORPORATION, OF BRISTOL, VIRGINIA, A CORPORATION OF VIRGINIA.

TREATING OF COAL AND MANUFACTURE OF BRIQUETTES.

Application filed August 9, 1920. Serial No. 402,168.

*To all whom it may concern:*

Be it known that I, CHARLES V. McINTIRE, a citizen of the United States, and a resident of East Orange, in the county of Essex and State of New Jersey, have made certain new and useful Improvements in the Treating of Coal and Manufacture of Briquettes, of which the following is a specification.

The invention, according to one phase thereof, relates to the method of and apparatus for handling and treating coal in order to collect from the coal a substantial portion of dust or minute particles and so as to obtain the rest of the coal in small pieces relatively free from dust. According to the preferred manner of realizing this invention there is provided within a rotating shell a plurality of compartments in one of which the drying operation is performed and in another of which there is a mass of balls—rods or equivalent loose falling members—that are employed or relied upon to effect a disintegrating or crushing of the coal into small pieces. The drying is effected by the employment of a hot gaseous medium, to wit, hot flue gas or products of combustion, passing first through the drying chamber and then through the disintegrating chamber or ball mill. During this passage of the hot gaseous medium it takes up or sweeps out of the coal the hot dry coal dust and leaves behind the larger and heavier pieces of coal. The dust-laden air is conducted from the ball mill to and through a suitable dust separator, such as a cyclone separator, wherein the gas is freed from the dust and the coal dust is collected. The construction of the apparatus is also such that the pieces of coal delivered from the mill can be collected independently of the dust separator and delivered to any place desired.

In the manufacture of briquettes by a process which involves the partial carbonization of coal, the crushing of the residue, the fluxing of the material preparatory to briquetting—preferably an operation involving the adding of a hydrocarbon binder to the crushed material and mechanical fluxing or agitating facilitated by the aid of steam until the material is in condition suitable for briquetting—the briquetting of the fluxed material and the subsequent carbonizing of briquettes, it has been found advisable to add a certain amount of raw coal in the form of dust to the crushed partially carbonized residue prior to or during the fluxing operation and the present invention has particular application to the procuring of a desired amount of coal dust for use in the manufacture of briquettes, according to the procedure above outlined.

The invention, furthermore, relates to the process of manufacturing briquettes (*a*) in which the coal is first dried and crushed in a ball mill in order to make available a greater amount of coal dust than would be obtained if the coal were not crushed; (*b*) in which the dust within the coal and that produced by the crushing of the coal are collected by means of hot gases of combustion which pass from a furnace of a furnace-retort through the dryer and ball mill to a collector where the raw coal dust is collected; (*c*) in which the pieces of coal from the ball mill pass to the interior of the retort of the furnace-retort wherein the coal is partially carbonized; (*d*) in which the partially carbonized coal or coal residue is crushed; (*e*) in which the crushed residue and some of the collected raw coal dust—and hydrocarbon binding material, as pitch, if the same is to be used—are brought together and fluxed preparatory to briquetting; (*f*) in which the briquetting operation is performed; and (*g*) in which the briquettes are subsequently carbonized.

The invention relates to the features above referred to as well as to others all of which are hereinafter fully described and clearly set forth in the accompanying claims.

As showing a specific manner in which the invention may be realized reference is made to the accompanying drawings, in which drawings, Figure 1 is a diagrammatic view illustrating an apparatus that includes a furnace-retort, a combined dryer and ball mill, a dust collector and a fan all arranged in operative relationship in such a manner that hot products of combustion of the furnace are by the fan sucked into and through the combined dryer and ball mill and into and through the dust collector whereby raw coal dust is picked up by or entrained with the hot products of combustion in flowing through the dryer and ball mill and is conveyed to the dust separator where it collects. The apparatus illustrated in this figure is also constructed so that the pieces of coal delivered from the ball mill are conducted to the interior of the retort where a carbonizing operation is performed. In fact in the retort shown the coal is only partially carbonized.

Figure 2 is a diagrammatic view of the apparatus shown in Figure 1.

Figure 3 is a vertical sectional view taken as on the line 3—3 of Figure 1. Figure 3 shows in cross-section the dryer or drying chamber with which the apparatus is provided.

Figure 4 is a vertical transverse sectional view taken as on the plane indicated by the line 4—4 of Figure 1. Figure 4 is a cross-sectional view of the ball mill or disintegrating chamber with which the apparatus is provided.

Figure 5 is a vertical cross-sectional view taken as on the plane indicated by the line 5—5 of Figure 4. Figure 5 illustrates how lifters may be employed on the exterior or discharge side of a screen at the discharge end of the ball mill or disintegrating chamber. In Figures 3, 4 and 5 the parts are on a somewhat larger scale than they are in Figures 1 and 2.

Figure 6 illustrates diagrammatically a plant for producing partially carbonized coal at one place, for collecting dry coal dust at another place, for crushing the partially carbonized coal, for bringing the crushed partially carbonized coal and raw coal dust together into a mixture to which a binding material may be added, for fluxing the mixture preparatory to briquetting, for briquetting and for subsequently carbonizing the briquettes. In the plant illustrated in this figure it will be seen that there has been embodied in toto the apparatus illustrated in Figure 1 for producing partially carbonized coal and for obtaining and collecting the desired amount of raw coal dust.

Referring now to the drawings in detail, 1 represents a furnace-retort that is provided with a retort proper, as 2, surrounded by a combustion chamber 3 whereby the retort 2 is exteriorly heated. The fuel for heating may be supplied to the interior of this combustion chamber in any suitable manner, as by gas supply pipes 4 and branch pipes 5. Air for supporting combustion may enter the combustion chamber 3 in any suitable manner, as through passageways 6 controlled by dampers 7. The hot products of combustion pass from the combustion chamber 3 through any suitable conduit, as 8, through a heating chamber 9 that is constructed about the exterior of the tubular shell 10, which is in effect a cylindrical shell, within which a drying chamber 18 and disintegrating chamber or ball mill 19 are located. This shell 10 is supported in any suitable manner, as by means of anti-friction bearing members indicated at 12.

The hot products of combustion which pass into and through the heating chamber 9 surround a major portion of this shell, thereby exteriorly heating the shell and indirectly heating the material therein. A manner in which products of combustion accomplish this purpose is clearly indicated, as by the arrows. From the interior of the heating chamber 9 the hot products of combustion, or gaseous heating medium as it may be broadly referred to, pass through a pipe or conduit 13 into the shell at one end thereof. This shell rotates about an axis which is slightly inclined to the horizontal and this positioning of the shell facilitates the movement of coal through the shell.

It will be readily appreciated that a suitable sealing means is provided, as at 14, between a fixed head 15 into which the conduit 13 terminates and the extreme end—to wit the charging end—of the cylindrical shell 10. Any suitable means, as chutes 16, may also be provided whereby coal can be fed into the cylindrical shell 10. This shell is divided by a perforated intermediate partition or screen 17 into drying chamber 18 and disintegrating chamber 19 previously mentioned. The chamber 18 is termed the drying chamber because therein the major portion of the drying is effected, but it will be appreciated that some small amount of drying is effected in the disintegrating chamber. Said shell is also provided with a perforated partition 20 located at or adjacent to the extreme discharge end thereof. The partition 20 is sometimes referred to as the discharge end partition or screen. Balls, as 21, are provided in the space between the partitions or screens 17 and 20, and the perforations or openings in said partitions or screens are constructed so as to permit of the passage of the hot gaseous medium and also of the coal being treated but so that the balls 21 will be retained in the disintegrating space. On the exterior or discharge side of the partition 20 there may be provided, if desired, lifters as 22 that can be relied upon to assist in the ejecting of the pieces of coal from the apparatus as they are delivered from the disintegrating chamber or ball mill.

The heavier or relatively large pieces of coal thus discharged pass through chute or pipe 23 whereby they may be conducted to any suitable place, as to a closed hopper, 24, from which they are delivered as by suitable means to the interior of the retort proper 2. A relatively fixed head 25 is provided and between this and the discharge end of the shell there is provided any suitable sealing means, as at 26, which can be relied upon to make a relatively tight joint between the shell and said head. A pipe or conduit 27 leads from this head to any suitable dust separating means, to wit, a cyclone separator 28. The hot gaseous products of combustion are caused to flow from the combustion chamber through the conduit 8, through heating chamber 9, conduit 13, drying chamber 18, disintegrating chamber 19, conduit 27 and cyclone separator 28, by any suitable means as the fan or exhauster 29. As the hot products of combustion pass through the drying chamber 18 and disintegrating chamber or ball mill 19, it will be manifest that they are in direct contact with the coal being treated.

In order the facilitate the direct drying action within the drying chamber, lifters 30 have been provided. As the shell rotates these lifters cause a continuous changing of the coal gradually passing through the chamber. A certain amount of direct drying action necessarily takes place in the disintegrating or crushing chamber, but as previously indicated this is small as compared with the drying that takes place in the chamber 18. The hot gases flow through this chamber at a sufficiently high rate of speed to create what may be referred to as a stream or draft of hot gaseous medium. This stream or draft of gaseous medium picks up or entrains the relatively dry coal dust and conveys it to the cyclone separator 28 where the dust is separated from the gaseous medium. The hot products of combustion dry the coal or, in other words, absorbs the moisture within the coal and convey it from the dryer and ball mill. In order to prevent a precipitation of this moisture prior to a collecting of the coal dust, the conduit 27 and the separator 28 are each provided with a heat insulating jacket or covering 31 and 31ª respectively.

In the operating of the apparatus the coal is fed to the interior of the shell at one end thereof, through chute 16, and gradually passes through the drying chamber 18, being continuously raised by the lifters and dropped therefrom while the hot products of combustion are in direct contact therewith. The dust-laden products of combustion are passed through the intermediate partitions or screens 17, the ball mill or disintegrating chamber 19 and ultimately through the discharge end partition or screen 20 to the dust separating means, to wit, the cyclone separator 28. The dried pieces of coal also ultimately pass through the inner perforations or openings of the intermediate screen or partition 17 where they are subjected to the disintegration or crushing action of the balls within the chamber 19, and finally the crushed coal passes through the openings of the screen 20 to a position where it is conveyed from the apparatus, as previously indicated.

It will be observed that in the construction shown the paths of travel of the coal and of the hot gaseous medium which directly contacts therewith are in the same direction and thus between the coal and gaseous medium counter-forces—forces working in opposition to each other—are entirely eliminated or at least reduced to a minimum.

It will also be observed that during the drying operation the coal being treated is relieved of the dust therein and that any dust resulting from the disintegrating or crushing of the dry pieces of coal is picked up and conveyed by the gaseous medium to the separator, leaving behind the relatively clean pieces or small chunks of coal which can be collected and used as desired, as by feeding to the interior of the retort.

It will also be apparent that by using a flue gas for effecting the drying there is eliminated any danger or likelihood of explosion or fire during the picking-up, conveying and collecting of the coal dust in the various portions of the apparatus.

Referring now to Figure 6, it will be noted that the apparatus shown in Figure 1 has been embodied in and constitutes a main part of Figure 6. The corresponding parts in Figures 1 and 6 are indicated by the same reference characters and therefore further description thereof at this time is deemed unnecessary. In Figure 6, however, it will be observed that the raw coal dust which is collected by the dust separator 28 is conveyed by any suitable means, as 32, to a storage means or hopper, as 33. The residue from the interior of the retort 2 which, as previously indicated, is in the form of partially carbonized coal, is conveyed by any suitable means, as 34, to a crusher 35 which renders the residue in finely divided form. Said residue is thereafter conveyed by any suitable means, as 36, to a storage bin or hopper 37. A predetermined amount of crushed partially carbonized coal and also a predetermined amount of raw coal dust are delivered in any suitable manner, as by means of a conveyer 38, to the top of a fluxer 39 wherein the material is fluxed and rendered in condition suitable for briquetting. Means, as 40, is provided whereby a predetermined amount of pitch may be fed into the material on its way to the fluxer. From the fluxer 39 the material is conveyed, as by means 41, to the briquette press 42 and from this press the briquettes pass over a cooling conveyer 43 from which they are ultimately fed into the interior of a retort 44 where a carbonizing operation is performed.

In the manufacture of briquettes, according to this method the coal within the retort 2 is subjected to temperatures approximating 850 to 900 degrees F. in a manner to effect a partial carbonization and in a manner to leave a relatively uniform residue. Within the retort 44, which is generally an inclined furnace, the briquettes are subjected to a considerably high temperature, to wit, a temperature of upward 1400 degrees F.

By the arrangement of the dryer and ball mill shown, briquettes can be made with any desired proportion of raw coal dust and partially crushed coal and thus control to a nicety the manufacture of and also the character of the ultimate briquette. While the partial carbonizing of the coal is being effected, as in retort 3, of the furnace-retort, any gases or vapors which are evolved during this carbonizing operation may be withdrawn from the retort through any suitable means, as for instance through an outlet pipe or main leading from the interior of the furnace to any suitable gas cleaning and collecting apparatus, or to any other place where it is desired to use said gases or vapors.

The improvements herein set forth are not limited to the precise construction and arrangement shown and described for they may be embodied in various forms and modifications without departing from the spirit and scope thereof.

What I claim is:

1. In the handling and treating of coal the method involving passing coal through apparatus comprising a dryer and a ball mill arranged in a manner to dry the coal and to thereafter subject the dry coal to the disintegrating or crushing action of the ball mill; during the drying and crushing passing a stream of hot products of combustion through the dryer and ball mill in direct contact with the coal in each and by said stream picking up the dust particles and conveying them from the dryer and ball mill; conducting said dust-laden products of combustion to a dust-separating means where the coal dust is collected, and separately collecting the pieces of coal or heavier particles as they are delivered from the ball mill.

2. In the handling and treating of coal and the separately collecting of dry coal dust in one place and pieces of dry coal in another, the method comprising passing coal through apparatus having a dryer and a ball mill arranged in a manner to dry the coal and to subject the coal to the disintegrating or crushing action of the ball mill; during the drying and crushing passing a stream of hot products of combustion through the dryer and ball mill in direct contact with the coal in each and by said stream picking up the dust particles and conveying them from the dryer and ball mill; conducting said dust-laden products of combustion to a dust-separating means whereby dry coal dust is collected at one place, and collecting the pieces of dry coal delivered from the apparatus at another place.

3. In the handling and treating of coal the method which comprises subjecting coal, when in a revolving shell, to the drying action of hot products of combustion that are caused to pass through such shell in a manner to directly contact with the coal therein and in a manner whereby dust in the coal is picked up by said hot products of combustion and conveyed from a drying chamber within said shell; causing the dry coal to be subjected to the disintegrating and crushing action of a ball mill within said shell, into and through which ball mill the hot products of combustion pass in direct contact with the coal therein in a manner to further dry the same and also in a manner to entrain therein dust given off or produced as a result of the crushing operation, passing the products of combustion which are laden with dust from the drying chamber and ball mill to means whereby the coal dust is separated from the gaseous products of combustion and collected, and collecting at another place the pieces of coal which are delivered from the ball mill.

4. In the treating of coal to collect dry coal dust in one place and pieces of coal in another, the method which comprises feeding coal to the interior of a revolving shell and therein subjecting the coal to the drying action of hot products of combustion that are caused to pass through such shell in a manner to directly contact with the coal and in a manner whereby dust in the coal is entrained by said hot products of combustion and conveyed from a drying chamber within said shell; also causing the coal to be subjected to the disintegrating and crushing action of a ball mill that is within said shell, into and through which ball mill the hot products of combustion pass in direct contact with the coal therein in a manner to entrain dust given off or produced as a result of the crushing operation, passing the products of combustion which are laden with dust from the drying chamber and ball mill to means whereby the coal dust is separated from the gaseous products of combustion and collected at one place, and collecting at another place the pieces of coal delivered from the shell.

5. In coal handling and treating apparatus, in combination a combustion chamber wherein there is produced hot gaseous products of combustion, a shell suitably supported and provided with means whereby the same can be continuously rotated, means whereby the hot gaseous medium first supplies heat to the exterior of the shell and thereafter enters the shell at one end thereof, means for feeding coal to be treated into that end of the shell into which the gaseous medium enters, said shell having lifters whereby the coal fed into the shell is continuously changed in position so that substantially all of the coal within the shell has direct contact with the hot gaseous medium flowing therethrough, a perforated intermediate partition or screen in the shell for dividing it into a drying chamber within which the lifters are located, and a compartment within which are members for disintegrating or crushing coal, a discharge end partition or screen at or near the discharge end of the shell, balls located in the space between said partitions, which balls are the members for effecting the disintegrating or crushing of the coal, the perforations of which partitions are of such size and shape that the balls are retained in the space between the partitions, a dust collector and a conduit extending from the delivery end of the shell to the dust collector, means for causing the passage of the hot gaseous medium from the place where produced into and through said shell, conduit and dust collector, and means whereby pieces of coal delivered from the ball mill or disintegrating chamber can be passed from the apparatus and collected.

6. In coal treating apparatus, means for supplying a gaseous heating medium, a shell suitably supported and provided with means whereby the shell can be continuously rotated, means whereby the hot gaseous medium first supplies heat to the exterior of the shell and thereafter enters the shell at one end thereof, means for feeding coal to be treated into that end of the shell in which the gaseous medium enters, said shell having means therein whereby the coal fed into the shell is continuously changed in position so that substantially all portions of the coal within the shell are directly contacted with by the gaseous medium flowing through the shell, a perforated intermediate partition in the shell that divides it into a drying chamber and a disintegrating chamber, a perforated discharge end partition at or near the discharge end of the shell and serving to define one end of the disintegrating chamber, balls located in the disintegrating chamber, the perforations of the partitions being of such size and shape that the balls are retained in the space between the partitions, a dust collector and a conduit extending from the shell to the dust collector, means for causing the passage of the gaseous heating medium through said shell, conduit and dust collector, and means whereby pieces of coal delivered from the ball mill or disintegrating chamber pass from the apparatus.

7. An apparatus of the class described comprising in combination a shell, suitable bearing members on which the shell is rotatably mounted, means for rotating the shell, means defining a heating chamber on the exterior of the shell and providing a conduit leading from said heating chamber to the interior of the shell, which shell has an intermediate partition with suitable perforations and serves to sub-divide the interior of the shell whereby it includes a drying chamber and a disintegrating chamber, lifters in the drying chamber, balls within said disintegrating chamber and thus providing a ball mill, and means whereby dust-laden gases are conducted through a second conduit to a dust separator, said apparatus also having means whereby the heavier pieces of coal, such as are not removed from the dryer and ball mill by convection, are ultimately delivered from the ball mill and collected.

8. An apparatus of the class described comprising in combination a shell, suitable bearing members on which the shell is rotatably mounted, means for rotating the shell, a conduit for supplying a hot gaseous medium to the interior of the shell, which shell has an intermediate partition with suitable partitions on one side of which partition there is located a drying chamber and on the other side of which partition there is located a disintegrating chamber, balls within said disintegrating chamber, and means whereby dust-laden gases are conducted from said shell through a second conduit to a dust separator, said apparatus also having means whereby pieces of coal, such as are not removed from the drying and disintegrating chamber by convection, are ultimately delivered from the shell.

9. An apparatus of the class described comprising a shell mounted so that it may be rotated, means for rotating the shell, a fixed head at each end of the shell, an intermediate perforated partition or diaphragm dividing the interior of the shell into a drying chamber and a disintegrating chamber, a partition or diaphragm at or near the end of the shell wherein the disintegrating chamber is located, balls in said disintegrating chamber, the partitions or diaphragms having openings or perforations of such size and shape that the balls are retained in the space between the partitions, means providing a heating chamber on the exterior of that portion of the shell within which the drying chamber is located, means for conducting hot gases from the interior of said heating chamber through one of the fixed heads to the interior of the shell, and means for feeding coal through one of the heads to the drying chamber within the shell.

10. An apparatus of the class described comprising a rotatable shell, a head at each end thereof, an intermediate perforated partition or diaphragm dividing the interior of the shell into a drying chamber and a disintegrating chamber, a partition or diaphragm at or near the end of the shell wherein the disintegrating chamber is located, crushing members in said disintegrating chamber, the partitions or diaphragms having openings or perforations of such size and shape that the balls are retained in the space between the partitions, means for supplying hot products of combustion, means for causing the hot products of combustion to flow through one of the heads along and through the interior of the shell and out through the other head, means for feeding coal through one of the heads to the interior of the shell, and means for conducting pieces of dry crushed coal from the interior of the shell through the other head.

11. A crushing and drying apparatus constructed so that it comprises a tubular shell mounted so as to rotate about an axis that has a slight slope with respect to the horizontal, means for rotating said shell, an intermediate partition or diaphragm which divides the shell into a drying chamber located at the uppermost portion and a disintegrating chamber at the lowermost portion, lifters within the drying chamber, a head associated with the end of the tubular shell which is uppermost, means for feeding material to be dried and crushed through said head to the interior of the shell, a partition or diaphragm at or near the end of the shell which is lowermost, balls within the space between said partitions, which balls constitute disintegrating or crushing members within the disintegrating or crushing chamber, said partitions having perforations or openings through which hot gases and solid particles pass in transit through the tubular shell but which perforations or openings are of such size and shape that the balls or the like are retained in the space between the partitions, a head at the end of the tubular shell which is lowermost, and means whereby solid particles delivered from the disintegrating or crushing chamber are passed from the apparatus, the heads being constructed so that and means being provided whereby hot gases can be passed through the drying chamber and disintegrating chamber.

12. A crushing and drying apparatus constructed so that it comprises a tubular shell mounted so as to rotate about an axis that has a slight slope with respect to the horizontal, an intermediate partition or diaphragm which divides the shell into a drying chamber located at the uppermost portion and a disintegrating chamber at the lowermost portion, lifters within the drying chamber, a head at each end of the tubular shell and associated therewith, means for feeding material which is to be dried and crushed through the head at the uppermost end of the shell, a partition or diaphragm adjacent to the lowermost end of the shell, balls within the space between said partitions, said partitions having perforations or openings through which hot gases and solid particles pass in transit through the tubular shell but which openings or perforations are of such size and shape that the balls are retained in the space between the partitions, means whereby solid particles delivered from the disintegrating or crushing chamber are passed from the apparatus, the heads being constructed so that hot gases can pass through the drying chamber and disintegrating chamber, and means whereby said passage of hot gases is effected.

13. In the manufacture of briquettes, the method which comprises subjecting coal to the action of a dryer and ball mill, passing hot products of combustion from a furnace of a furnace-retort wherein coal is partially carbonized to and through a dryer and ball mill to dry the coal and to sweep from the coal the dust that is within and produced from the coal being dryed and crushed, subsequently separating the coal dust from the hot gases and collecting the raw coal dust, conveying the dry crushed coal to the interior of a retort of a furnace-retort wherein coal is treated in a manner to leave a partially carbonized residue, crushing the partially carbonized residue, mixing said crushed partially carbonized residue and the raw coal dust, fluxing the mixture, forming briquettes from the fluxed mixture, and subsequently carbonizing the briquettes thus produced.

14. In the manufacture of briquettes, the method which comprises subjecting coal to the action of a dryer and ball mill, passing hot products of combustion from the furnace of a furnace-retort wherein coal is being partially carbonized, to and through the dryer and ball mill to dry the coal and to sweep from the coal the dust that is within and produced from the coal being dried and crushed, separating the coal dust from the hot gases and subsequently collecting the coal dust, passing the pieces of dry crushed coal to the retort and partially carbonizing, crushing the partially carbonized residue, mixing this crushed partially carbonized residue and the coal dust, fluxing the mixture, forming briquettes, and subsequently carbonizing the briquettes.

15. The manufacture of briquettes by the method which comprises partially carbonizing coal in a retort of a furnace-retort, crushing the partially carbonized residue, fluxing the residue, forming briquettes and subsequently carbonizing briquettes thus produced; and which method is characterized by subjecting coal to be briquetted to a preliminary drying and a crushing operation in a dryer and ball mill, delivering dry crushed coal to the retort, said drying being effected by hot gases from the furnace of the furnace-retort, which hot gases pass through the dryer and ball mill, collecting by means of hot gases dust within the coal and produced from the coal by the crushing operation, and adding coal dust thus obtained to the partially carbonized residue prior to the termination of the fluxing operation, whereby the raw coal dust thus obtained becomes a part of the briquettes which are subsequently carbonized.

16. The manufacture of briquettes by a method which involves the partial carbonizing of coal in a retort of a furnace-retort, the crushing of the partially carbonized residue, the fluxing of the residue, the forming of briquettes therefrom and the subsequent carbonizing of the briquettes thus produced; and characterized by the initial subjecting of the coal to a drying and a crushing operation in a dryer and ball mill in a manner whereby coal is delivered to the retort in a hot and dry condition and in small pieces, and whereby coal dust within the coal and produced as a result of the crushing operation within the ball mill is collected in a dry condition, the drying of the coal and the collecting of the dry coal dust being dependent upon the employing of the hot gaseous products delivered to the dryer and ball mill from the furnace of the furnace-retort; and further characterized by the adding of the raw coal dust thus obtained to the crushed partially carbonized residue prior to the termination of the fluxing operation whereby the raw coal becomes a part of the briquettes which are subsequently carbonized.

17. An apparatus of the class described comprising in combination a furnace retort, a dryer in a rotatable shell, a dust collector, a conduit extending from the rotatable shell to the dust collector, said dust collector and conduit being provided with means for heat insulating the exterior of each, and a briquetting means, means constructed and arranged so that pieces of coal from the dryer are fed to the interior of the retort of the furnace retort, means constructed and arranged so that hot products of combustion from the furnace of the furnace retort are ultimately conducted into the shell of the dryer whereby said hot products of combustion directly contact with the coal in the dryer in a manner to remove from the coal some of the dust contained therein and so that the hot products of combustion laden with the dust thereafter pass through the conduit to the dust collector wherein the dust and the products of combustion are separated; the apparatus also having means constructed and arranged so that the coal residue from the retort and the dust received from the coal are brought together and ultimately pressed into briquettes by the briquetting means.

This specification signed this 5th day of August A. D. 1920.

CHARLES V. McINTIRE.